(12) United States Patent
Hageman et al.

(10) Patent No.: US 6,549,126 B2
(45) Date of Patent: Apr. 15, 2003

(54) DRY INTERFACE CORNER ACTUATOR SINGLE SENSOR FOR LINING WEAR AND LOW RESERVOIR DETECTION

(75) Inventors: John B. Hageman, Vandalia, OH (US); Paul Rymoff, Jr., Bellbrook, OH (US); Ernst S. Baumgartner, Dayton, OH (US); John C. Layman, Trotwood, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/769,644

(22) Filed: Jan. 25, 2001

(65) Prior Publication Data

US 2002/0024433 A1 Feb. 28, 2002

Related U.S. Application Data

(60) Provisional application No. 60/229,429, filed on Aug. 31, 2000.

(51) Int. Cl.$^7$ ................................................. B60Q 1/00
(52) U.S. Cl. ...................... 340/454; 340/452; 340/450.1
(58) Field of Search ................................. 340/454, 452, 340/459, 623, 624, 450.1; 200/84 C, 624; 60/534; 116/227

(56) References Cited

U.S. PATENT DOCUMENTS 3,947,813 A * 3/1976 Uemura et al. .............. 340/454
5,046,313 A * 9/1991 Crumb ........................ 340/454

* cited by examiner

Primary Examiner—Anh V. La
(74) Attorney, Agent, or Firm—Scott A. McBain

(57) ABSTRACT

The present invention provides a sensor system for detecting lining wear and fluid level in a dry interface corner actuator for a single wheel brake including a reservoir assembly. The reservoir assembly includes a reservoir for containing fluid for the actuator and a sensor assembly positioned in the reservoir having a single set point to indicate both low reservoir fluid level and a need for brake lining replacement.

16 Claims, 2 Drawing Sheets

DRY INTERFACE CORNER ACTUATOR SINGLE SENSOR FOR LINING WEAR AND LOW RESERVOIR DETECTION

RELATED APPLICATIONS

This application claims the benefit of U.S. Provisional Application No. 60/229,429, filed Aug. 31, 2000.

TECHNICAL FIELD

The technical field of this disclosure is brake fluid reservoirs. In particular, a brake fluid reservoir is provided with a single sensor for detecting a condition of low fluid level in the reservoir as well as brake lining wear.

BACKGROUND OF THE INVENTION

Hydraulic braking systems have typically been the basis for vehicle braking systems, especially automotive braking systems. Hydraulic systems are used to convert fluid pressure into linear and/or mechanical motion. Such systems allow the source of the hydraulic pressure to be positioned remotely from the cylinders that affect the braking action. These systems comprise an actuator, such as a brake pedal, reservoir fluid which is responsive to pressure applied by the actuator, (such as a master cylinder) and means for converting the hydraulic pressure to a braking force, generally fluid cylinders. Mechanical braking pressure is achieved by utilizing the force of the depression of the brake pedal by the driver to increase the pressure on the master cylinder. Such systems are typically accompanied by a vacuum boost that multiplies the force supplied to the brake pedal, throughout the braking operation. The increased pressure in the master cylinder is then transmitted through fluid lines to the fluid cylinders. The fluid cylinders operate the calipers thereby forcing the calipers and brake pads against the rotors and/or drums which slows the vehicle by frictional force.

Hydraulic systems of the above-described type have many disadvantages. These include the large amount of volume and mass that the master cylinder, vacuum booster, ABS modulator and hydraulic lines add to the completed vehicle. Installation of standard hydraulic braking systems is also complicated and labor intensive. Additionally, the large number of parts and installation also adds to repair and maintenance issues as individual parts reach the end of their useful life. A variant form of applying a vehicle brake system is referred to as a brake by wire brake system (BBW). BBW describes the ability to activate vehicle wheel brakes via an electric signal generated by an onboard processor/controller as a result of input signals thereto. Brake torque is applied to the wheels without direct mechanical interaction between the vehicle's brake pedal and the wheel brake.

A particular type of BBW systems is known as a "dry interface corner" system (DIC). The typical DIC system operates when a driver inputs a force to the brake pedal. A force sensor and travel sensor attached to the pedal transmits an electronic signal to an electronic controller, which in turn sends the signal to the self contained braking device typically located at each wheel of the vehicle. The DIC system is known as a hybrid system in that electric signals are used to generate the type and amount of braking force required at each wheel of the vehicle with electrical wires rather than standard hydraulic brake lines. Located at each corner of the vehicle is a self-contained module which takes the electrical signal and mechanically brakes the vehicle. The self-contained module utilizes an individual motor that drives a ball screw piston assembly that pressurizes hydraulic brake fluid to ultimately apply the brake caliper to a rotor at that corner of the vehicle. Such a DIC system significantly reduces assembly cost. The individual modules can be separately assembled and fluid filled prior to the manufacture of the vehicle. DIC modules then only need to be bolted to the automobile during the assembly process and plugged in using standard electrical connections. Thus, reliability and quality control of the overall brake system is also increased. Finally, the elimination of hydraulic lines stretching throughout the vehicle as well as the elimination of the master cylinder, booster, and ABS modulator reduces space requirements within the engine compartment.

Brake cylinder fluid level can presently be determined from visual inspection of the reservoir. Some master cylinder reservoirs include reed sensors to detect low fluid level. Typical master cylinder assemblies use a single reservoir to feed multiple wheel brake assemblies. Reed sensors positioned in the reservoir are commonly used to indicate low fluid level by sending a signal to trigger an indicator, such as a warning light, in the vehicle. Because the reservoir on these systems feeds two or more wheel brake assemblies, a specific location and cause of the low fluid level is not identified.

Brake lining wear in some systems can be detected by manual inspection. In recent years lining wear sensors of variant and different forms have been placed on the brake pad. One form of brake pad sensor gives off a noise that is audible to the driver as an indication that the brake linings are worn down to a predetermined point. Another form of sensor has an electrical connection to provide a warning light within the vehicle when the brake lining is worn down to a predetermined point. Although these systems can be reliable, it is not cost effective to place sensors directly on the brake pads.

It would be desirable to have a sensor system that would overcome the above disadvantages.

SUMMARY OF THE INVENTION

An aspect of the present invention provides a sensor system for detecting lining wear and fluid level in a dry interface corner actuator reservoir assembly when each actuator is used with a single wheel brake. Included as part of the actuator reservoir is a reservoir assembly. The reservoir assembly includes a reservoir for containing fluid for the actuator and a sensor assembly positioned in the reservoir as part of a cap assembly having a single set point to indicate both low reservoir fluid level and a need for brake lining replacement.

Other aspects of the invention provide a reservoir that can be sized to hold a predetermined volume of fluid. The single set point can be based on the predetermined volume of the reservoir. The sensor assembly can further include a cylinder, a float including a sensor activator positioned within the cylinder, and a sensor switch positioned adjacent the cylinder wherein the reservoir is sized to hold a predetermined volume of fluid and the sensor switch has a single set point to allow the sensor switch to indicate both low fluid level and brake lining replacement when activated by the sensor activator.

The sensor activator can include a magnetic ring attached to the float that activates the sensor switch when the fluid in the reservoir is at a predetermined level. The sensor can be electrically connected to a warning device through an opening in a valve stem of the reservoir cap assembly.

Another aspect of the present invention includes a method for single sensor indication of an abnormal leak condition or normal low reservoir fluid and brake lining wear condition in a single wheel brake dry interface corner actuator including positioning a sensor having a single set point in a reservoir portion of a reservoir assembly, tripping the single set point when fluid in the reservoir reaches a predetermined level and sending an indication of one of a leak condition and/or a brake lining wear condition from the sensor.

Another aspect of the present invention includes a sensor system for detecting lining wear and fluid level in a dry interface corner actuator for a single wheel brake including means for positioning a sensor having a single set point in a reservoir portion of a reservoir assembly, means for tripping the single set point when fluid in the reservoir reaches a predetermined level, and means for sending an indication of one of a leak condition and/or brake lining wear condition.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PRESENTLY PREFERRED EMBODIMENTS

Figure 1:
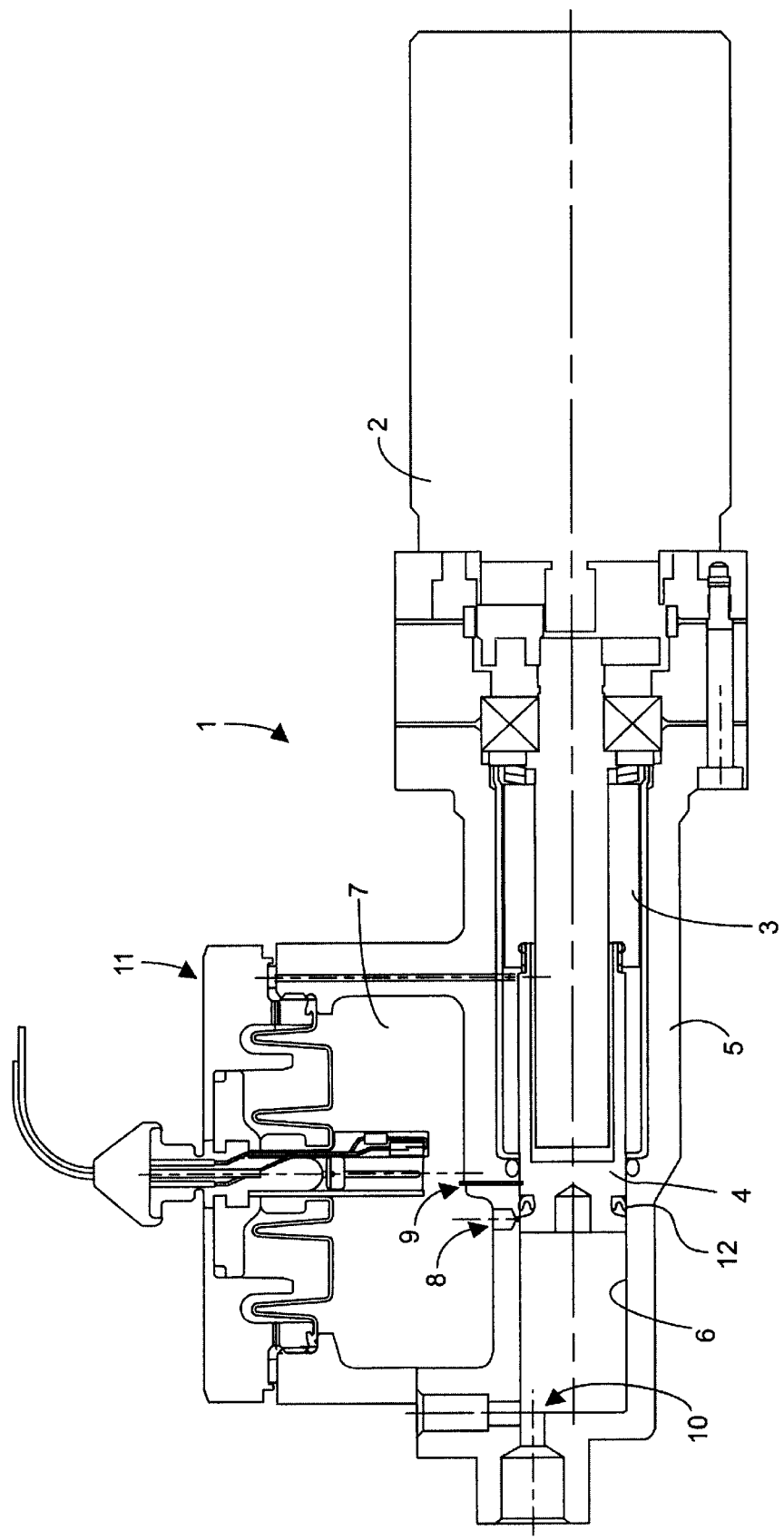
FIG. 1 shows an embodiment of the independent hydraulic actuator assembly for a wheel brake assembly.

The Dry Interface Corner (DIC) brake system shown in FIG. 1 can provide an independent hydraulic actuator assembly 1 for each wheel brake assembly. The actuator assembly can include a motor 2 that drives a gear mechanism and a ballscrew assembly 3 that applies and releases a hydraulic piston 4 in an actuator body 5. The actuator body 5 can include a bore 6 that communicates with a brake fluid reservoir 7 through a bypass hole 8 and a compensating hole 9. The actuator assembly 1 can be in hydraulic communication with the wheel brake (not shown) through the bore outlet 10. In the embodiment of FIG. 1, when the actuator assembly 1 is at the brake-released position, the brake fluid path between the wheel brake and the actuator fluid reservoir 7 is open. This allows brake fluid to flow to and from the fluid reservoir 7 due to brake fluid expansion and contraction as a result of temperature change and brake fluid compensation due to brake lining wear.

During a brake apply, seal 12 on piston 4 closes off the bypass hole 8 allowing pressure to be built up in bore 6 which translates to brake force at the wheel brake assembly. The fluid volume in the reservoir 7 is sufficient to compensate for full brake lining wear at that particular wheel brake.

Figure 2:
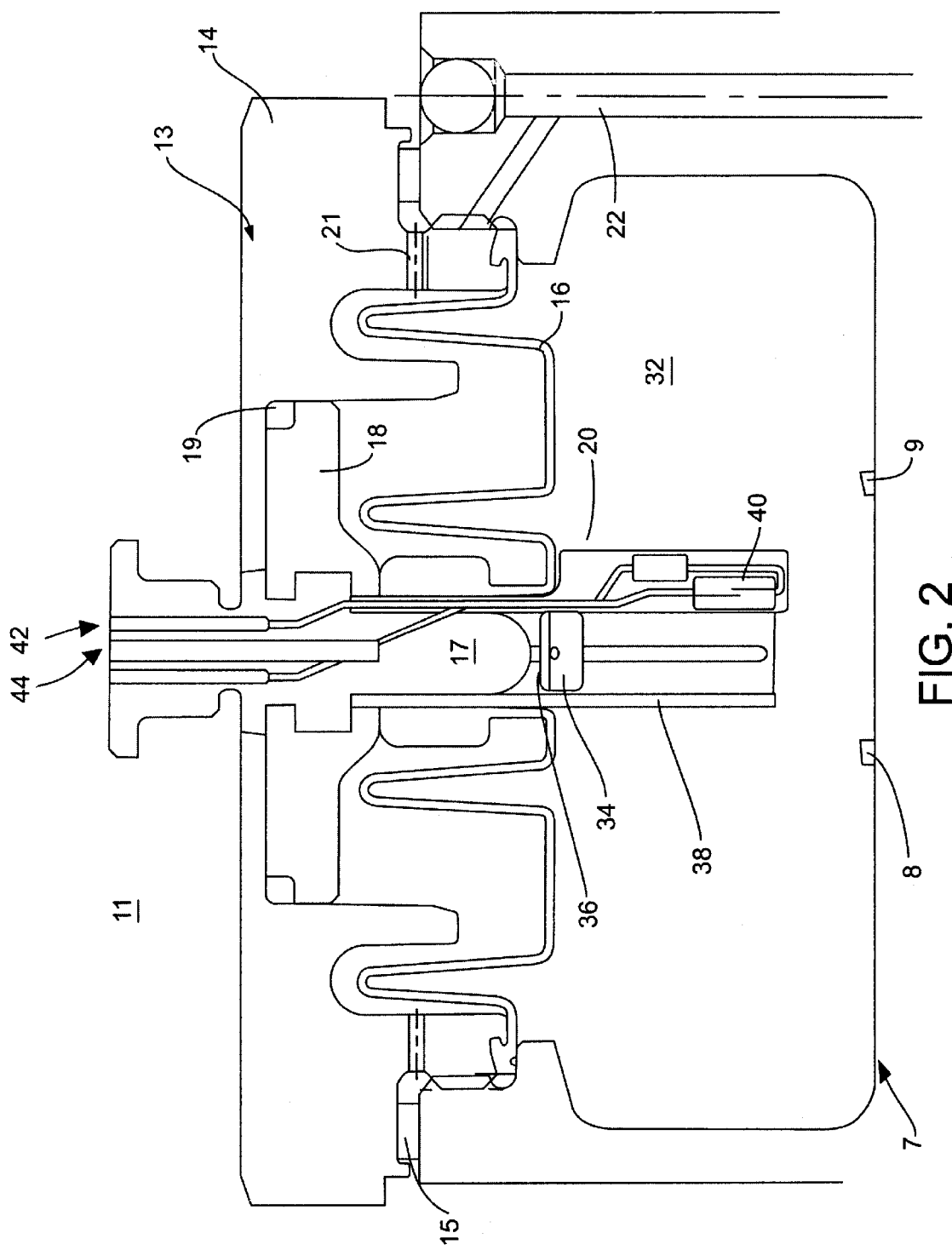
FIG. 2 shows an embodiment of a portion of the actuator assembly of FIG. 1.

Referring to FIG. 2, an embodiment of a reservoir assembly in general is shown at 11. The brake fluid is contained in the reservoir 7 and sealed from the outside environment by the cap assembly 13. The cap assembly 13 for this design can consist of several components. There is an external cap 14 and a seal 15 that attaches to the reservoir 7 and seals this interface. There is a convoluted diaphragm 16 that isolates the brake fluid and unfolds to compensate for reduced fluid volume in the reservoir 7 as brake fluid is used to compensate for brake lining wear. The inside diameter of the diaphragm 16 seals around the outside diameter of the valve stem 17. Valve stem 17 is molded into the inner cap 18. The inner cap 18 is sealed against the external cap 14 by means of seal 19. There is an air vent passage 21 in the external cap 14 that connects to an air vent channel 22. The channel 22 vents to atmosphere in a method not shown. The vent channel 22 exposes the area between the inner cap 18 and the diaphragm 16 to atmospheric pressure. This allows the diaphragm convolutes to unfold as fluid is used from the reservoir 7 resulting in atmospheric pressure balance on both sides of the diaphragm 16.

In addition, a normally open reed sensor 20 extends into the fluid reservoir 32. A float 34, with a magnetic ring 36 is guided in a hollow cylinder 38. The position of the reed switch 40 is such that the magnet 36 causes the switch 40 to activate at a fluid level to indicate a condition of low fluid in the reservoir 32. This may occur, for example, due to substantial lining wear of the brakes. The activation of the switch 40 will result in lighting a brake warning light (not shown). The sensor or switch 40 is electrically connected through the connection 42. This connection 42 will also provide a cover for the fluid port 44, which may be a fluid fill and/or bleed port as shown.

This description is for one embodiment of a dry interface corner (DIC) actuator design. In addition to detecting a low fluid level in a reservoir associated with an individual brake assembly, the single trip point sensor detects both a low fluid level in the reservoir and provides an indication of the need to change brake linings due to wear, for example. The actuator reservoir cap and diaphragm are designed such that the brake corner assembly can be bled and filled to the desired brake fluid level without removing the reservoir cap. This is an advantage both in initial assembly evacuate and fill procedures and in service pressure bleed of the design. At the initial build, this eliminates spills and potential contamination in the reservoir. The invention also allows service bleeding without removing the reservoir cap that minimizes the potential of dirt and debris in the reservoir. The cap design and the service bleed adapter are designed such that the reservoir can be filled to the desired level without visually seeing the fluid level.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A sensor system for detecting lining wear and fluid level in a dry interface corner actuator for a single wheel brake comprising:
    a reservoir assembly for the single wheel brake including
        a reservoir for containing fluid for the actuator;
    a sensor assembly for the single wheel brake positioned in the reservoir having a single set point to indicate both low reservoir fluid level and a need for brake lining replacement in the single wheel brake.

2. The system of claim 1 wherein the reservoir assembly is included in a brake actuator assembly.

3. The system of claim 1 wherein the reservoir is sized to hold a predetermined volume of fluid.

4. The system of claim 3 wherein the single set point is based on the predetermined volume of the reservoir.

5. The system of claim 1 wherein the sensor assembly includes a cylinder, a float including a sensor activator positioned within the cylinder, and a sensor switch positioned adjacent the cylinder;

wherein the reservoir is sized to hold a predetermined volume of fluid and the sensor switch has a single set point to allow the sensor switch to indicate both low fluid level and brake lining replacement when activated by the sensor activator.

6. The system of claim 5 wherein the sensor activator comprises a magnetic ring attached to the float that activates the sensor switch when the fluid in the reservoir is at a predetermined level.

7. The system of claim 1 wherein the sensor is electrically connected to a warning device through an opening in a valve stem of the reservoir cap assembly.

8. The system of claim 7 wherein the valve stem of the reservoir assembly includes a fluid port.

9. The system of claim 8 wherein the fluid port is a fluid bleed port.

10. The system of claim 8 wherein the fluid port is a fluid fill port.

11. The system of claim 8 wherein the fluid port is both a fluid bleed port and a fluid fill port.

12. A method for single sensor indication of a leak condition and brake lining wear condition in a single caliper dry interface corner actuator comprising:

positioning a sensor having a single set point in a reservoir portion of a reservoir assembly of a single wheel brake;

tripping the single set point when fluid in the reservoir reaches a predetermined level; and sending an indication of one of a leak condition and/or a brake lining wear condition from the sensor.

13. A sensor system for detecting lining wear and fluid level in a dry interface corner actuator for a single wheel brake comprising:

means for positioning a sensor having a single set point in a reservoir portion of a reservoir assembly for the single wheel brake;

means for tripping the single set point when fluid in the reservoir reaches a predetermined level; and means for sending an indication of one of a leak condition and/or brake lining wear condition of the single wheel brake.

14. The system of claim 13 wherein the means for positioning the sensor includes locating the sensor adjacent a hollow cylinder extending into the reservoir.

15. The system of claim 14 wherein the means for tripping the single set point includes a float located in the hollow cylinder.

16. The system of claim 15 wherein the float includes a magnetic ring.

* * * * *